(No Model.)  3 Sheets—Sheet 1.
W. S. SMITH.
CLOSED CONDUIT ELECTRIC RAILWAY.
No. 511,254. Patented Dec. 19, 1893.
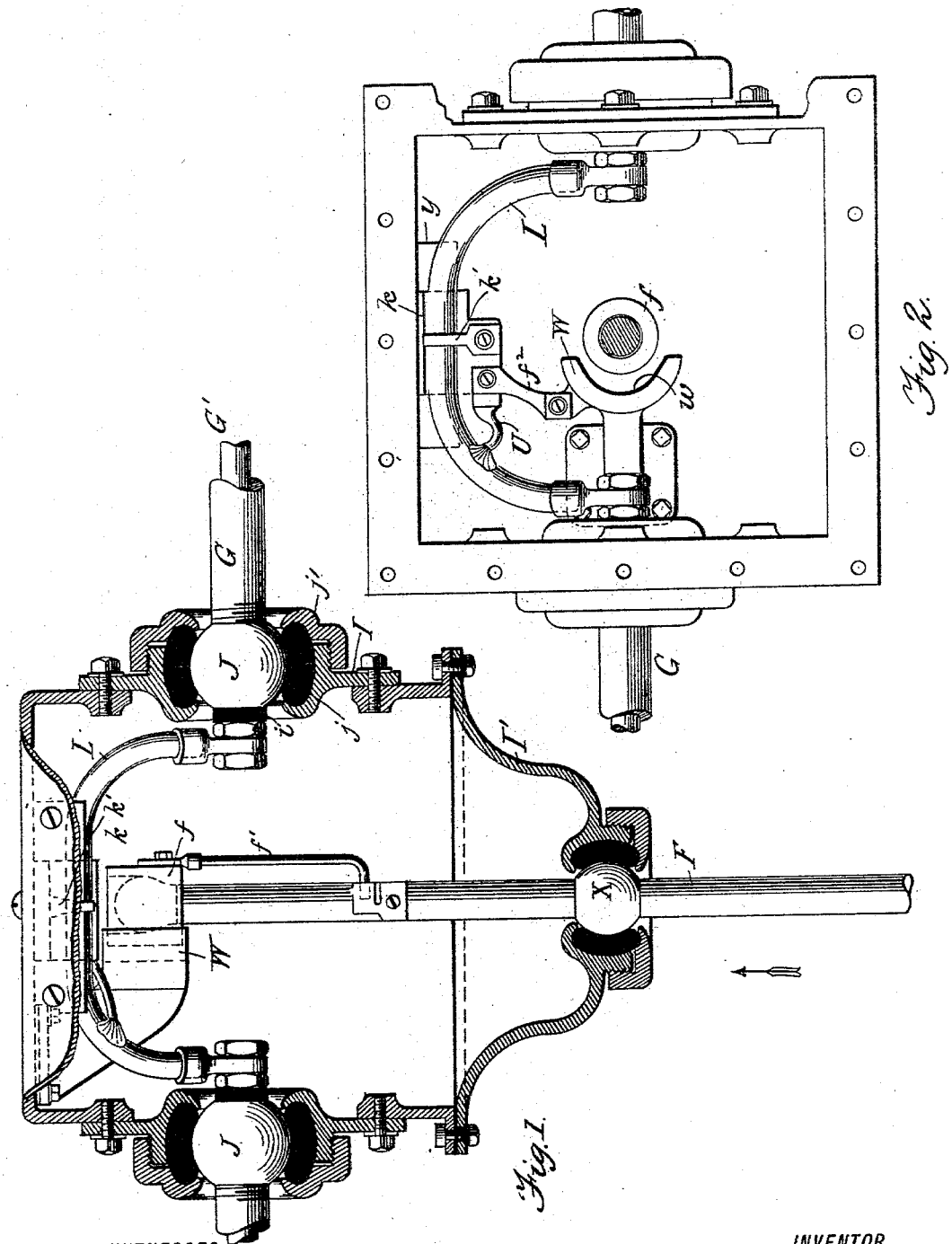
WITNESSES:
James F. Kavanagh.
Wm. W. Rosenbaum.
INVENTOR
William S. Smith
BY
W. J. Johnston
ATTORNEY.

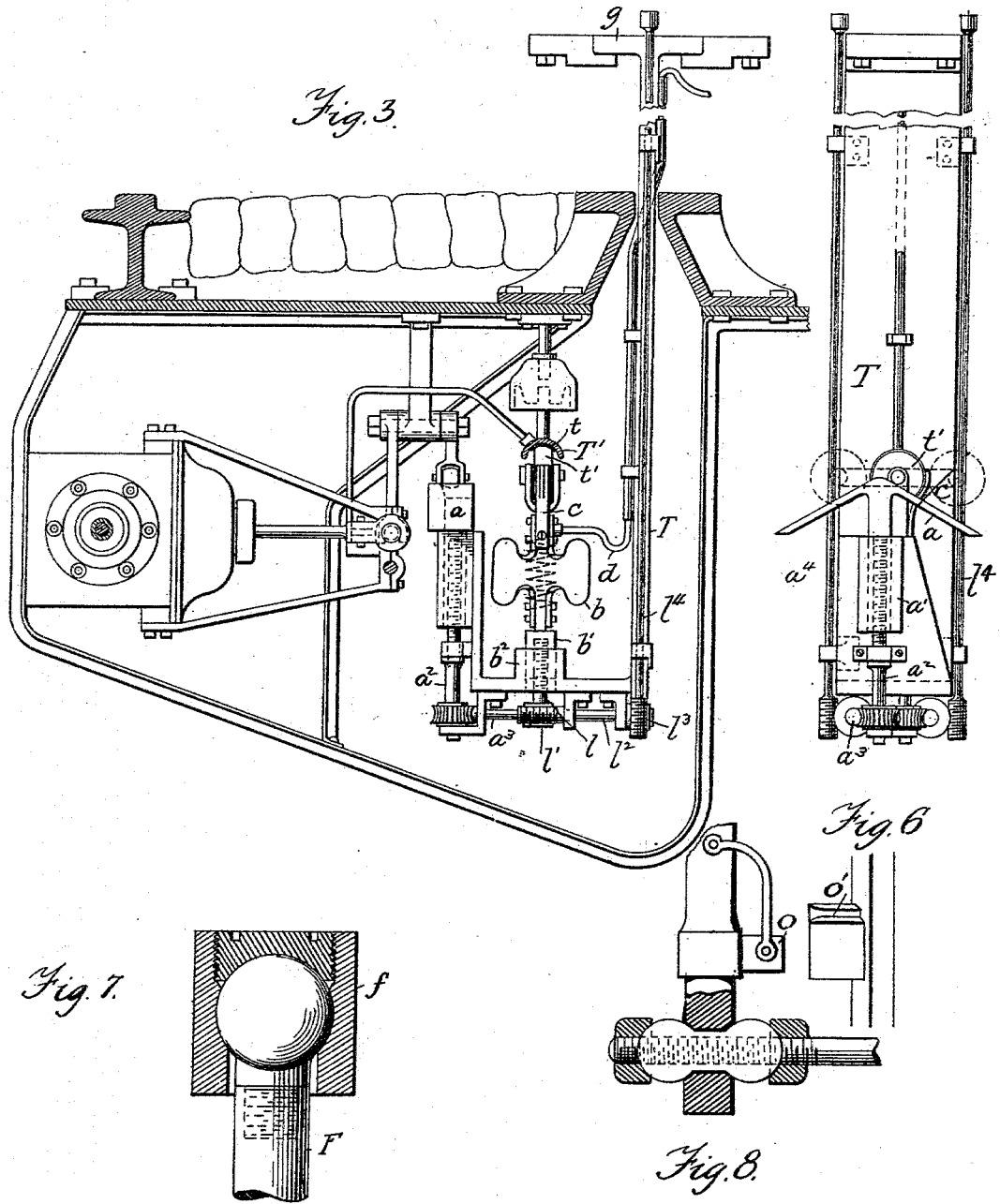

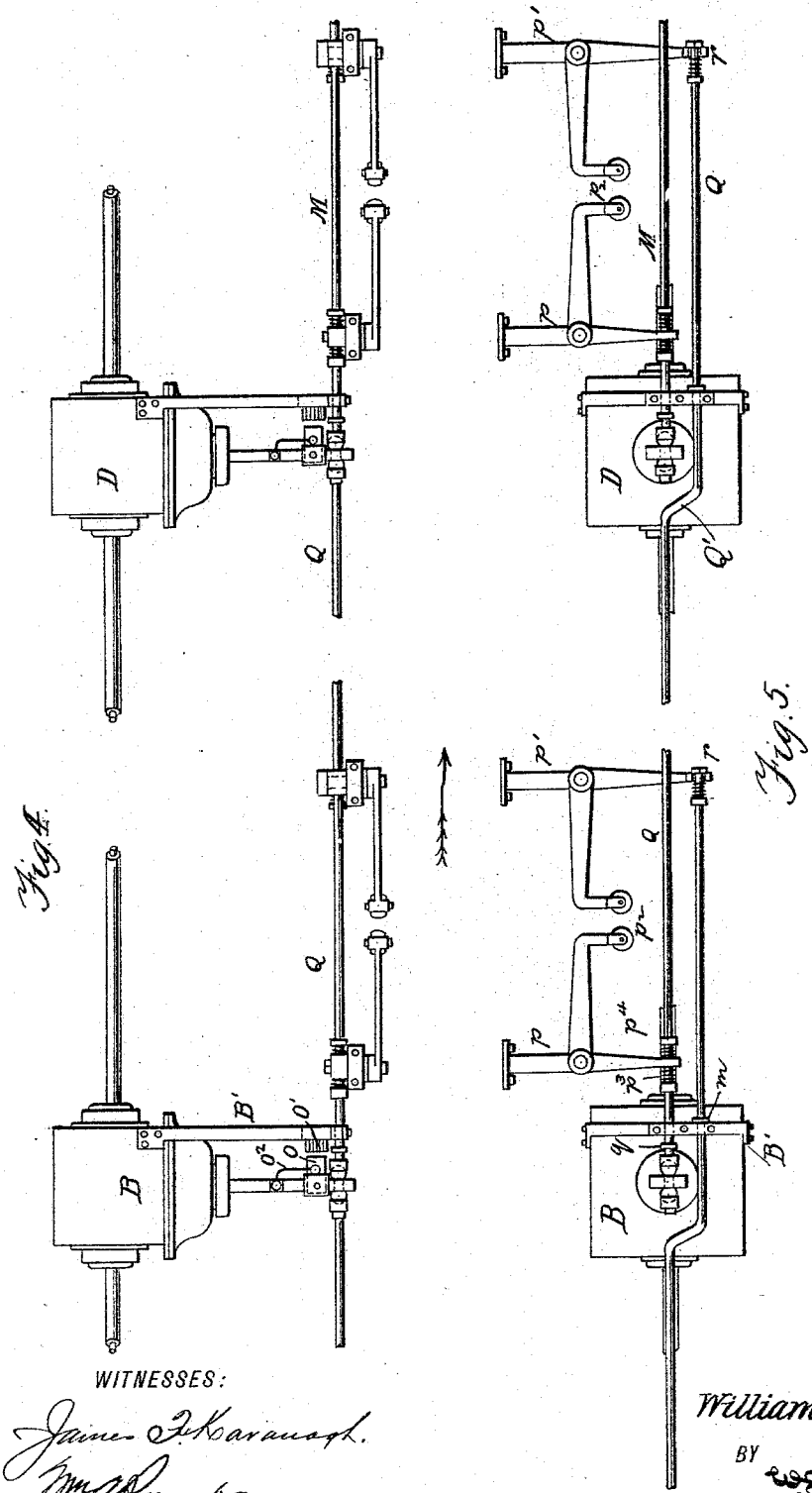

UNITED STATES PATENT OFFICE.

WILLIAM STUART SMITH, OF BERKELEY, CALIFORNIA.

CLOSED-CONDUIT ELECTRIC RAILWAY.

SPECIFICATION forming part of Letters Patent No. 511,254, dated December 19, 1893.

Application filed February 29, 1892. Serial No. 423,125. (No model.)

*To all whom it may concern:*

Be it known that I, WILLIAM STUART SMITH, a citizen of the United States, residing in Berkeley, county of Alameda, and State of California, have invented certain new and useful Improvements in Electrical Railways, of which the following is a specification.

This railway is designed for underneath or conduit driving, the object being to devise a system suitable for surface roads in the streets of cities which shall dispense with the very undesirable overhead wires and produce a road which is cheap to construct and maintain and reliable in its workings. In order that it may be cheap to maintain it is necessary, among other things, that leakage should be reduced to a minimum and in order that it may be reliable in its working it is necessary, among other things that the liability to grounding of the circuits should be reduced to a minimum. In order that leakage may be reduced to a minimum in a circuit where there is necessarily continual moisture it is obvious that the main wire must be entirely insulated from the trolley wire at all times except when connection is absolutely necessary in order to furnish current to the car motors. This being the case some means must be provided for making this connection when required and this must, of course, be done automatically by the passing car. Means must also be provided for automatically breaking the connection when no longer needed. I have endeavored to accomplish these ends in the following manner: It is proposed that the main and feeder wires be thoroughly insulated and drawn into metal tubes, preferably iron for cheapness and strength, the lengths of these combined wires and tubes being such as may be found most convenient in practice. The wires are to have the ends bare for a short distance, the bare portion projecting from the tubes at each end. Junction boxes must be provided for joining these various sections of tubes and wires and these must be so designed that the settling of the ground with consequent throwing out of line will not break the electrical continuity of the mains or feeders or impair the insulation. It is also desirable that the entire system be readily accessible for repairs or renewals without disturbing any but the impaired portion. For all these purposes three styles of junction boxes will be required, viz: plain boxes for joining the ends of the sections of tubing and wires; similar boxes having in addition facilities for leading in and joining the feeder ends; and similar boxes with means for taking off branches to the trolley wire and facilities for making and breaking contacts.

I have drawn the junction box having means for taking off branch circuits and this is typical of them all.

In the accompanying drawings, Figure 1 is a section of the box showing the details of construction. Fig. 2 is a view looking into the box as indicated by the arrow in Fig. 1, the cover being removed. Fig. 3 is a cross-section of the road bed and conduit, also showing the current collecting device. Fig. 4 is a plan of the circuit controlling apparatus. Fig. 5 is a view of the same apparatus taken at right angles to Fig. 4. Fig. 6 is a side elevation of the current collecting device. Fig. 7 is a detail of a contact maker, and Fig. 8 is a detail of a flexible insulated joint hereinafter referred to.

In Fig. 1, G is the tube having within the carefully insulated wire G' as shown. This tube is threaded at each end and truly spherical balls J J are screwed upon it at each end. This ball is packed as shown so as to be water-tight. The side of the box is open, the opening being closed by a cover I, this being made tight by any suitable means. The cover is formed into a stuffing or packing box as shown and is filled with soft rubber or equivalent packing $j$, which is set up by the follower or cover $j'$ by screwing it on the flange of the box projecting outward. The ball J is screwed upon the tube until it is flush with the end; the inner half of the rubber packing having been placed in the packing box the tube end is inserted until the ball bears against the rubber and the projecting end of the wire extends into the junction box. The outer half of the rubber packing is then placed in position around the ball, it having been previously slipped onto the tube before screwing on the ball. The cover or follower $j'$ is then screwed upon the packing box until it presses upon the rubber and forces it slightly against the ball. It is obvious then that in case of any section getting out of line the ball can roll slightly in its rubber socket without admitting moisture. Connection is made between the wires of two tubes by means of the flexible conductor L which is secured by nuts as shown, these being insulated from the ball and end of the tube by an insulating washer $i$. $y$ is a piece of ebonite or other insulating material secured in the box (preferably in the upper corner as shown) and to this is secured a piece of metal $k$. $k'$ is a ring loosely encircling the flexible conductor L and is intended merely to steady it and prevent its coming in contact with the sides of the junction box through displacement. The description thus far given is for a plain junction box without means for taking off branches. It should, of course, be closed by a plain flat cover, having the shape and dimensions of the perforated flange shown in Fig. 2, by the removal of which the interior is made accessible. The box for admitting a feeder to be attached to the main would differ by being deeper so as to allow room for three or four packing boxes instead of two, the number depending upon the manner of leading in the feeder, in order that the feeder may pass through it or into it by means of a branch and be connected to the main within.

In case any junction box gets out of order or it becomes necessary to replace any section of tube it can be done as follows: Remove the cover from the box and disconnect the flexible conductor or connector within; screw back the followers $j'$ from two consecutive boxes and remove the outer halves of the rubber packing; the balls J can then be screwed back upon the tube; one end of the tube can then be slipped into its junction box until the other end clears its box when it can readily be removed; the cover I may be removed or not as may be found necessary. Possibly a removable cover may not be required at all. By this means two men or even one man can remove any faulty box or section and replace it by a sound one in a few minutes, it being supposed, of course, that the conduit is so framed as to make boxes and tubes accessible.

For taking off branches to the trolley wire the box is arranged as shown in the drawings. The cover I' of this box, (which may be flat or extended as shown to give increased length within the box) carries a packing box of the same design as those for connecting the sections of tubes and in this is pivoted the lever F which carries the ball X. By this means the lever is enabled to turn on X through a small angle without permitting any moisture to enter the junction box. It may be expedient to make the ball X of insulating material and in any case the cover should be carefully insulated from the body of the box in order to reduce the liability of grounding through contact between the lever or ball and the cover of the box. The inner end of this lever carries a loose cylindrical contact $f$ carried on a ball connection so as to allow of some automatic adjustment as shown in Fig. 7. This is connected by a light flexible wire $f'$ to the lever arm for better electrical connection. Moving this lever through a small angle brings the cylindrical end into contact with a metallic piece W which is bolted fast to the side of the box and thoroughly insulated therefrom. This piece W has a concave surface $w$ which is connected by a fuse $f^2$ to the metal block $k$ and this in turn is connected to the flexible connector L by means of a light flexible connection U by splicing or otherwise. If desirable this inner connection between the lever and piece $w$ can be made by means of a knife switch. The outer end of the lever carries a single blade $o$ of a knife switch the double portion of which is shown at $o'$, Figs. 4 and 6. The object of having a knife switch at the outer end is primarily because this form of switch will lock the lever by friction between the parts when contact is made and prevent its springing away from contact and for this reason a knife switch may be necessary at the inner end. The lever is connected to this knife $o$ by means of the flexible wire $o^2$ for better electrical contact. Ordinarily the lever stands in the position shown with the contacts broken both within and without the box. There is thus a double break and the angular motion of the lever can be made very small. The method of giving this motion will be explained later.

The trolley carrier T is rigidly secured to the car truck in such a manner as to be firm and steady yet readily removed. It is shown as being held by the head $g$, but the manner of securing will depend largely upon the make of the truck. It should be secured to the truck instead of the car in order that the trolley may not partake of the motion of the car springs. It leads down through the slot into the conduit and has the shape of an L as shown. The trolley wire T' is to be of a substantial iron rolled into the form of a segment of a cylinder and insulated as shown, or by an equivalent method. It is proposed to have a strip $t$ of hard drawn or rolled copper or bronze secured in the crown of the cylindrical iron trolley wire for a contact surface and for conductivity, though the iron would be of sufficient cross-section for this latter purpose. The trolley wheel $t'$ is convex and made to fit the curve of the trolley strip as shown. It is carefully insulated from the trolley carrier T. $c$ is a brush likewise carefully insulated from the carrier and connected by a flexible wire $d$ which leads through an insulating tube up the face of the trolley carrier to the controlling switch. The wheel is carried by a double leaf spring $b$ of the form shown, having fair stiffness combined with considerable range. A spiral spring or other form that will give an equivalent motion can be used though this form seems the best. This spring is carried by a block $b'$ which moves in a guide $b^2$ formed in the bottom of the trolley carrier. The block is also hollow and threaded for a screw $l$ which is connected with the worm gear $l'$ which in turn engages with a rod $l^2$ extending along the bottom of the trolley carrier. Its other end carries a worm gear $l^3$ which engages with a worm on the lower end of a vertical rod $l^4$ which leads to the fastening beneath the car. By turning this rod by means of a hand wheel or wrench the motor man can work the worm gearing and thus by means of the screw $l$ raise or lower the block $b'$ thus increasing or decreasing the tension of the spring and with it the pressure of the trolley against the trolley strip. As the spring has considerable range the trolley will always be in contact with the trolley strip and not jar off by any ordinary motion of the car. The form of the trolley wire gives great stiffness and keeps the trolley in place, thus avoiding the danger of breaking the circuit while under way; a much more serious matter with conduit driving than with overhead driving.

The short vertical part of the trolley carrier carries a double angular piece $a$ which moves in a guide $a'$ and is raised and lowered by the motor man from within the car through the rods $a^2$, $a^3$, $a^4$ and their connecting worm gearing in a similar manner to that of the trolley. The object of this will be explained later.

In Figs. 4 and 5 two junction boxes are shown with the arrangements for making and breaking connection between the main and the trolley wires. The box B is shown in position with the switch lever F in its normal position and both inner and outer contacts broken. Through the end of the switch lever passes a switch controlling rod Q, this rod being insulated from the switch controlling lever in the manner indicated by the detail Fig. 8, or in equivalent manner. The two spheres with the short connecting piece are to be of ebonite or other insulating material, and are held in position on the rod by means of the two concave nuts as shown. The switch controlling rod Q is supported by a bearing in a bracket B' (which may be carried on the box or secured to the conduit framing) and it extends forward to the next box D where it has an offset sufficient to allow it to pass below the end of the switch lever of box D and is continued a short distance past the box D as shown. The box D is similarly fitted with a switch controlling lever M which extends forward to a short distance beyond the next box, and so on over the whole length of the road. At each box, supported from the roof of the conduit as shown in the section through conduit, or in any other manner than may be found convenient, are two bell cranks $p$ and $p'$ with horizontal and vertical arms as shown (or arms in equivalent position). The horizontal arm carries a roller $p^2$ and the vertical arm is forked and embraces the switch controlling rod. The action can now be understood. The car passing along carries with it (secured to the trolley carrier) the double tripping piece or contact controller $a$. The height of this is regulated so that as it passes underneath the roller $p^2$ it lifts the arm $p$ and revolves the bell crank through a small angle. This action throws the vertical arm forward in the direction of motion of the car which is indicated by the arrow and by means of the fork embracing the rod Q and bearing against the stiff spring $p^3$ the rod Q is brought forward and the switch closed at both inner and outer contacts. This closing of the contacts makes connection between the main and trolley wires. The further motion of the car raises $p'$ and the car passes on to the next box D. Here in a similar manner the lever $p$ is raised and the contacts completed at box D, while box B is still connected. A slight further motion of the car raises lever $p'$ and through connection $r$ throws the controlling rod Q backward, thus breaking both contacts at box B leaving D alone in circuit. Thus the motion of the car keeps the trolley wire immediately under it alive while other sections are dead and consequently the leakage is a minimum. The trolley wire should, of course, be made in sections insulated from one another and to bridge these and prevent a break of current to the motor, it may be preferable to furnish the trolley with two wheels as shown in dotted lines in Fig. 6. The motion of the rods Q, M, &c., is controlled or limited by stops $q$ and $m$ which bring up against the brackets, thus preventing breakage or disarrangement of the contacts. When this stop bears against the bracket while the arm $p$, &c., is still rising the further motion of the arm is taken up by the spring shown at $p^4$. This is an open spring of sufficient stiffness to resist compression until the switch is closed and sufficient range to take up the continued motion of the arm $p$, &c. Of course this motion is to be regulated to the proper amount by raising or lowering the double angle piece $a$. The distance apart of boxes B and D will be such as is found best by practice. Of course there may be several plain junction boxes between B and D. In case of fire or other catastrophe which stops the car on the double track road it can run back again over the same track but in this case all contacts will remain closed on the return trip. This, however, would be of no consequence during the short time the emergency required such operation.

The junction boxes can, of course, be placed horizontal, vertical or at an angle as may be found convenient. The method of framing the conduit is not especially essential but I have indicated sufficiently to show that the road bed can be properly supported without interfering with the action of the system.

Having thus described my invention, I claim—

1. In an electric railway system, the combination of an insulated main conductor extending along the roadway, a secondary or working conductor, a branch conductor between the main and secondary conductors, a sealed box surrounding the branching point of the main and branching conductors, and a switch or cut-out at both ends of the branch conductor, one inside of the box and one outside thereof, substantially as described.

2. In an electric railway system, the combination of an insulated main conductor extending along the roadway, a secondary or working conductor, a branch conductor between the main and secondary conductors, a sealed box surrounding the branching point of the main and branching conductors, a switch or cut-out at both ends of said branch conductor, one inside of the box and one outside thereof, a moving vehicle and switch operating mechanism controlled thereby, whereby the circuit of the branch conductor is completed and broken at two points automatically by the vehicle, substantially as described.

3. In an electric railway system, the combination of an insulated main conductor extending along the roadway, junction boxes located at intervals therein, a secondary or working circuit also extending along the roadway, branch circuits between the main and secondary conductors, a rigid lever extending through and pivoted in the wall of the junction box and forming a portion of the branch circuit contacts inside and outside of said junction box and mechanism operated by the moving vehicles whereby the said lever may be swung on its pivot and the branch circuit completed and broken.

4. In a system of electrical distribution, a conductor constructed in sections in combination with junction boxes between the sections, there being ball and socket joints between the conductor and the walls of the boxes the socket in which the ball turns being of insulating material for the purpose set forth.

5. In a system of electrical distribution, a conductor of electricity made in sections, a junction box between the sections and a ball and socket joint between the ends of the sections and the box the socket in which the ball turns being of insulating material for the purpose set forth.

6. In a system of electrical distribution, a sectional conductor connected together by junction boxes, the ends of the conductor provided with balls which fit in sockets in the walls of the boxes, said sockets consisting of two half round blocks of insulating material held together by a clamping nut, substantially as described.

7. In an electric railway system, a main conductor and a secondary or working conductor, branch conductors connecting the two together and a double break cut-out in the branch conductors in combination with a rod connected with the cut out extending longitudinally along the roadway, a pivoted bell-crank lever connected with said rod and a device carried by the moving vehicles arranged to strike the bell-crank lever and thus operate the cut-out.

8. In an electric railway system, a main conductor, junction boxes through which the same passes at intervals, a secondary or working conductor, branch conductors connecting the two conductors together, double break cut-outs in said branch conductors consisting of a pivoted bar having contacts at each end, one outside and the other inside of said boxes, all in combination with a rod connected with one cut-out and extending past the next one following, two levers connected with said rod at different points and a device carried by the moving vehicles arranged to engage with said levers successively and cause the cut-out to successively make and break the branch circuit as set forth.

In witness whereof I have hereunto affixed my seal and signed my name in the presence of two subscribing witnesses.

WILLIAM STUART SMITH. [L. S.]

Witnesses:
JOHN LINDSLEY,
AUG. W. PAYNE, Jr.